Aug. 31, 1943.  F. W. CURTIS  2,328,061
HYDRAULIC VISE
Filed Nov. 16, 1942  2 Sheets-Sheet 1
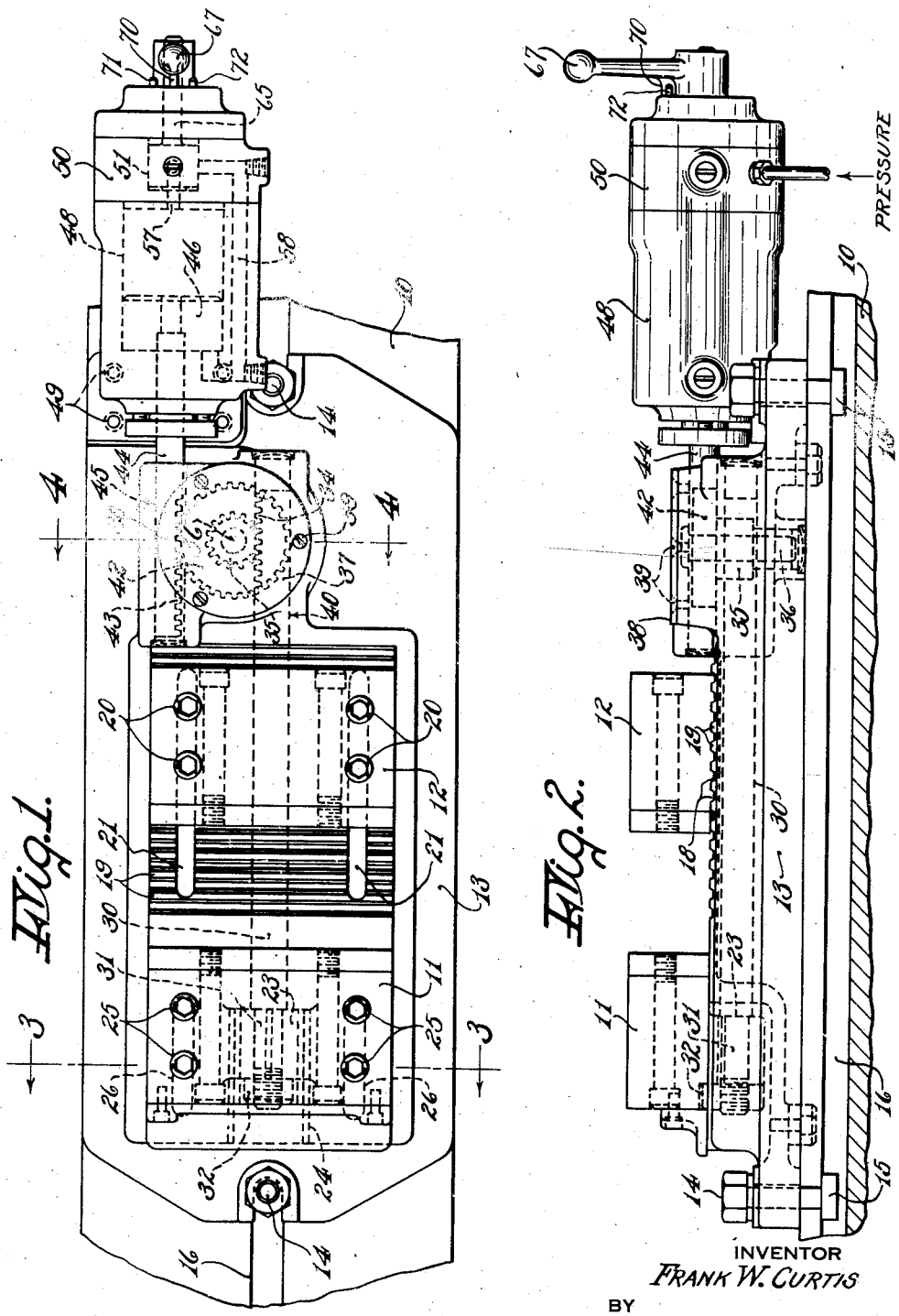
INVENTOR
FRANK W. CURTIS
BY
Chapin & Neal
ATTORNEYS Aug. 31, 1943.  F. W. CURTIS  2,328,061
HYDRAULIC VISE
Filed Nov. 16, 1942  2 Sheets-Sheet 2
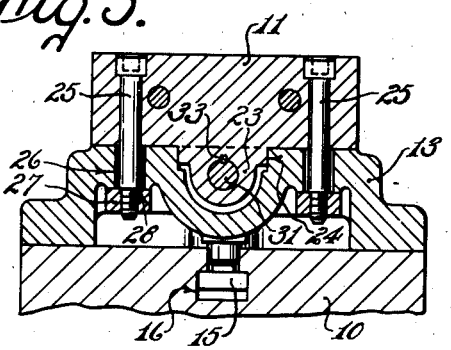
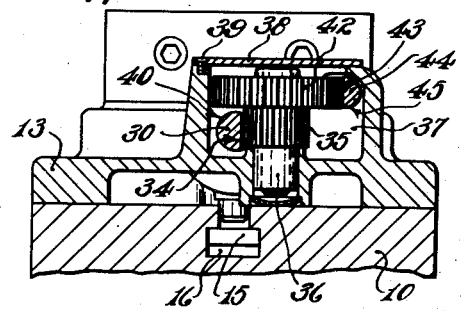
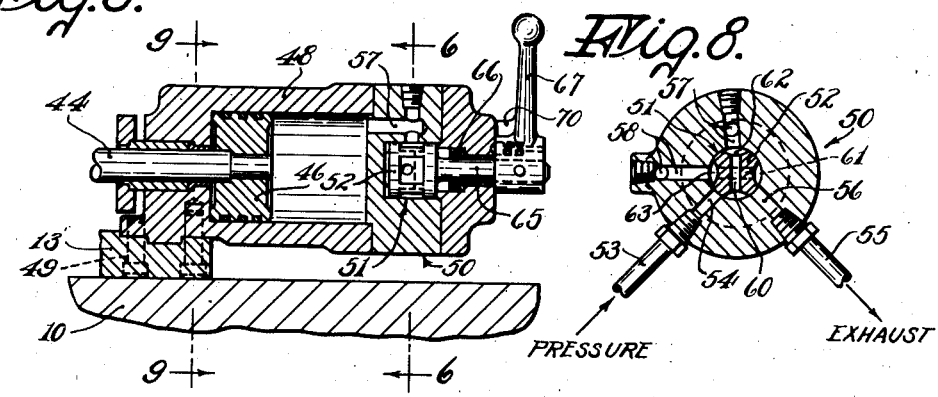
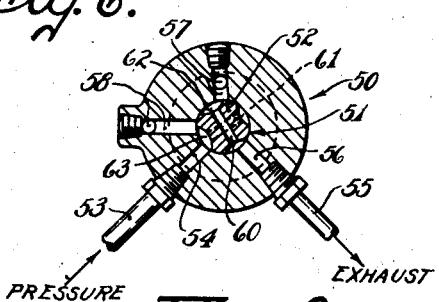
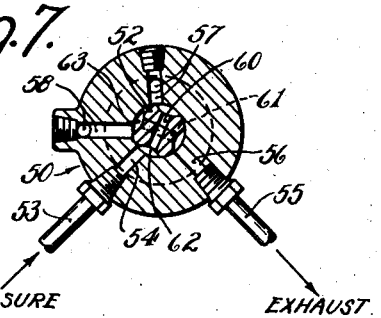
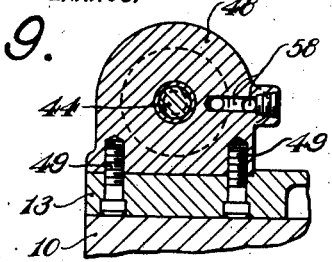
INVENTOR
FRANK W. CURTIS
BY
Chapin & Neal
ATTORNEYS Patented Aug. 31, 1943

2,328,061

UNITED STATES PATENT OFFICE 2,328,061

HYDRAULIC VISE

Frank W. Curtis, Springfield, Mass., assignor to Van Norman Machine Tool Company, Springfield, Mass., a corporation of Massachusetts Application November 16, 1942, Serial No. 465,728

2 Claims. (Cl. 90—60)

This invention relates to vises used on machine tools to hold the work in position on the bed or table of the machine.

The principal object of the invention is to a more compact and efficient vise for this purpose than has hitherto been available.

Other and further objects residing in details of construction will be apparent from the following specification and claims.

In the accompanying drawings which illustrate one embodiment of the invention,

Fig. 1 is a plan view of the vise;

Fig. 2 is a side elevational view of the structure shown in Fig. 1;

Fig. 3 is a sectional view substantially on line 3—3 of Fig. 1;

Fig. 4 is a sectional view substantially on line 4—4 of Fig. 1;

Fig. 5 is a longitudinal vertical sectional view of the power cylinder;

Figs. 6, 7 and 8 are section views substantially on line 6—6 of Fig. 5 respectively showing three positions of the control valve; and Fig. 9 is a sectional view substantially on line 9—9 of Fig. 5.

Referring to the drawings, 10 indicates the work supporting table of the machine tool upon which the vise is to be used, and it will be understood that support 10 may be stationary, reciprocated, rotated, or variously moved by mechanism not shown, depending on the type of machine tool with which the vise is employed.

The jaws 11 and 12 of the vise are carried by a support 13 adjustably mounted on the table 10 in any suitable manner as by bolts 14, having heads 15 engaging in the usual T-slots 16 in the table. Jaw 12 is provided on its under face with a plurality of transverse ribs 18 adapted to engage cooperating ribs 19 formed on the face of support 13. Jaw 12 is clamped in adjusted position on the ribbed portion of the support by bolts 20 extending through slots 21 in the support.

The jaw 11 is slidably mounted on the surface of support 13, and is guided for movement toward and from fixed jaw 12 by a block portion 23 which extends into slot 24 formed in support 13, and by machine bolts 25 which extend through slots 26 in the support and are threaded into guide blocks 27 engaging the under side of the support, as best shown in Fig. 3. The bolts are preferably shouldered at 28 to keep the proper spacing of the guide blocks to permit reciprocation of the jaw on the support.

Jaw 11 is moved toward and from fixed jaw 12 by means of a rod 30 having a reduced portion 31 extending through block 23. The end of reduced portion 31 is threaded to receive nut 32 by which the end of rod 30 is rigidly clamped to the block, a spline 33 preventing rotation of the rod in the block. The opposite end of rod 30 is slabbed off and provided with rack teeth 34 engaging a small pinion 35 fixed on a vertical shaft 36. Shaft 36 is journaled to rotate in a cylindrical chamber 37 formed in support 13, chamber 37 being closed by a cover plate 38 secured by machine screws 39. Rod 30 extends through a bore 40, in the wall of chamber 37, which guides and supports the free end of the rod. A second and larger pinion 42 is secured to shaft 36 and is engaged by a rack 43 formed on a slabbed off end portion of a rod 44, guided in a bore 45 in the wall of chamber 37. The other end of rod 44 is connected to a piston head 46 operating in a cylinder 48 mounted by means of screws 49 on support 13. Fluid pressure is admitted to cylinder 48 to operate piston 46 by a control valve 50 built into the head of the cylinder. Valve 50 comprises a central chamber 51 in which valve member 52 is rotatably mounted. Fluid pressure is supplied to the valve chamber through pipe 53 and passage 54 and exhausted through passage 55 and pipe 56. A passage 57 connects the valve chamber to the cylinder at the forward side of piston 46 and a passage 58 connects the valve chamber to the rear side of the piston. Valve member 52 is traversed by offset passages 60 and 61 terminating at their ends in grooves 62 and 63 respectively.

When the valve member 52 is in the position shown in Fig. 6 fluid pressure is admitted to the rear of piston 46 through passage 54 adjacent groove 63 and passage 58 at the same time that the forward end of the piston is exhausted through passage 57 and passages 60 and 56, thus driving the piston 46 to the right in Fig. 1 and imparting clockwise rotation to the pinions 42 and 35 to move rod 40 to the left whereby the jaws of the vise are separated.

When valve member 52 is rotated to the position shown in Fig. 7, fluid pressure is admitted to the forward side of the piston through passages 54, 60 and 57 at the same time that the rear side of the piston is exhausted through passages 58, 61 and 56, thus driving piston 46 to the left in Fig. 1 and imparting counterclockwise rotation to the pinions 42 and 35 to move rod 40 to the right, whereby the jaws of the vise are drawn together.

When valve member 52 is in the neutral position shown in Fig. 8, that is in a position intermediate the positions of Figs. 6 and 7, both the pressure part 54 and the exhaust part 56 are closed and the piston is locked in the position to which it had been moved by the immediately preceding position of the valve member.

The valve member 52 is provided with a stem 65, extending through a suitable packing 66 to the outside of the valve block, to which is secured an operating handle 67. Handle 67, which is shown in neutral position in Figs. 1, 2 and 5 is provided with a lug 70 adapted to engage a stop pin 71 when the valve member 52 is in the vise opening position of Fig. 6 and to engage a stop pin 72 when the member 52 is in the vise closing position of Fig. 7.

It will be apparent that a given movement of the piston 46 will produce a much less movement of jaw 11 due to the difference in size of the gears 35 and 42. This both reduces the necessary diameter of cylinder 48 and increases the available power. Furthermore, the stress in rod 30 being greater than in rod 44, an undesirable increase in the size of the former is avoided by the fact that it is in tension rather than compression during the working stroke.

What I claim is:

1. A hydraulic vise for machine tools and the like comprising a base portion, a vise jaw stationarily mounted on the base portion, a second vise jaw slidably mounted on the base portion, a hydraulic cylinder mounted on the base portion on that side of the stationary jaw remote from the movable jaw, a piston in the cylinder, a piston rod attached to the piston and having rack teeth formed thereon, a rod attached to the movable vise jaw and having rack teeth formed thereon, multiplying gearing connecting the two rods whereby the piston rod will be constrained to move faster than the second rod, and valve means controlling the admission of pressure fluid to said cylinder.

2. A hydraulic vise for machine tools and the like comprising a base portion, a series of transverse ribs and grooves formed thereon, a vise jaw having a series of transverse ribs and grooves interfitting selectively with certain of those on the base portion, means for clamping said vise jaw adjustably in position on the base portion, a second vise jaw slidably mounted on the base portion, a hydraulic cylinder mounted on the base portion on that side of the stationary jaw remote from the movable jaw and offset from the center thereof, a piston in the cylinder, a piston rod attached to the piston and having rack teeth formed on one side thereof so as to face towards the central plane of the jaws, a rod attached centrally to the movable vise jaw and having rack teeth formed on one side thereof so as to face the rack teeth on the piston rod, a pair of unequal gears rotatably mounted on the base portion between the two rods, the larger of said bears meshing with the rack teeth on the piston rod and the smaller of said gears meshing with the teeth on the second rod, and valve means controlling the admission of pressure fluid to said cylinder.

FRANK W. CURTIS.